(12) United States Patent
Rolland et al.

(10) Patent No.: US 7,857,358 B2
(45) Date of Patent: Dec. 28, 2010

(54) FITTING FOR USE WITH TUBING CONTAINMENT SYSTEM

(75) Inventors: Stirling Keith Rolland, Downingtown, PA (US); Dean W. Rivest, Oxford, PA (US)

(73) Assignee: Omega Flex, Inc., Middletown, CT (US)

( * ) Notice: Subject to any disclaimer, the term of this patent is extended or adjusted under 35 U.S.C. 154(b) by 7 days.

(21) Appl. No.: 12/207,626

(22) Filed: Sep. 10, 2008

(65) Prior Publication Data

US 2009/0066083 A1 Mar. 12, 2009

Related U.S. Application Data

(60) Provisional application No. 60/971,024, filed on Sep. 10, 2007.

(51) Int. Cl.
*F16L 33/00* (2006.01)

(52) U.S. Cl. .......................... 285/248; 285/13

(58) Field of Classification Search ............. 285/334.5, 285/903, 924, 353, 357, 384, 385, 246, 248, 285/13, 14, 96, 382
See application file for complete search history.

(56) References Cited

U.S. PATENT DOCUMENTS

| | | | | |
|---|---|---|---|---|
| 816,596 A * | 4/1906 | Perzoff | ............ | 285/222.5 |
| 1,371,981 A * | 3/1921 | Rose | ............ | 285/61 |
| 1,664,125 A * | 3/1928 | Lowrey | ............ | 285/13 |
| 2,082,164 A * | 6/1937 | Karrer | ............ | 285/14 |
| 2,113,211 A * | 4/1938 | Lake | ............ | 285/222.5 |
| 2,158,620 A * | 5/1939 | Eastman | ............ | 285/334.5 |
| 2,172,532 A * | 9/1939 | Fentress | ............ | 285/256 |
| 2,323,099 A * | 6/1943 | Patten | ............ | 285/14 |
| 2,848,254 A * | 8/1958 | Millar | ............ | 285/222.5 |
| 4,000,918 A * | 1/1977 | Reker | ............ | 285/93 |
| 4,042,262 A * | 8/1977 | Mooney et al. | ............ | 285/98 |
| 4,437,691 A * | 3/1984 | Laney | ............ | 285/353 |
| 4,630,850 A * | 12/1986 | Saka | ............ | 285/322 |
| 4,798,404 A * | 1/1989 | Iyanicki | ............ | 285/12 |
| 4,801,158 A * | 1/1989 | Gomi | ............ | 285/52 |
| 4,836,584 A * | 6/1989 | Baker | ............ | 285/351 |
| 4,842,309 A * | 6/1989 | LaVene et al. | ............ | 285/319 |
| 5,423,578 A * | 6/1995 | Kanomata et al. | ............ | 285/315 |
| 5,441,312 A * | 8/1995 | Fujiyoshi et al. | ............ | 285/23 |
| 5,454,603 A * | 10/1995 | Staley, Jr. | ............ | 285/14 |
| 5,799,989 A * | 9/1998 | Albino | ............ | 285/334.5 |
| 5,845,946 A * | 12/1998 | Thomas | ............ | 285/348 |

(Continued)

OTHER PUBLICATIONS

International Search Report, PCT/US 08/75766, Nov. 20, 2008.

(Continued)

*Primary Examiner*—Aaron Dunwoody
(74) *Attorney, Agent, or Firm*—Cantor Colburn LLP

(57) ABSTRACT

A fitting for use with metal tubing in a jacket, the fitting including: an adaptor having exterior threads at a first adaptor end, the adaptor having a longitudinal passage for fluid flow; a body having interior threads at a first body end, the interior threads engaging the exterior threads to secure the body to the body in a first body cavity; and a jacket lock ring positioned at a second body end, the jacket lock ring including barbs for engaging a surface of the jacket.

8 Claims, 2 Drawing Sheets

U.S. PATENT DOCUMENTS

| | | | |
|---|---|---|---|
| 6,019,399 A * | 2/2000 | Sweeney | 285/248 |
| 6,173,995 B1 * | 1/2001 | Mau | 285/55 |
| 6,428,052 B1 * | 8/2002 | Albino et al. | 285/23 |
| 6,431,608 B1 * | 8/2002 | Kato | 285/13 |
| 6,502,866 B1 * | 1/2003 | Hujisawa et al. | 285/249 |
| 6,877,781 B2 * | 4/2005 | Edler | 285/354 |
| 7,004,510 B2 * | 2/2006 | Treichel | 285/334.5 |
| 7,055,868 B2 * | 6/2006 | Watanabe | 285/249 |
| 7,300,076 B2 * | 11/2007 | Inoue | 285/248 |
| 2002/0079702 A1 * | 6/2002 | Baumann et al. | 285/343 |
| 2005/0023832 A1 * | 2/2005 | Edler | 285/354 |
| 2005/0285401 A1 * | 12/2005 | Treichel et al. | 285/903 |

OTHER PUBLICATIONS

PCT International Preliminary Report On Patentability for International Application No. PCT/US2008/075766, mailed Mar. 25, 2010, 6 pages.

* cited by examiner

FITTING FOR USE WITH TUBING CONTAINMENT SYSTEM

CROSS-REFERENCE TO RELATED APPLICATIONS

This application claims the benefit of U.S. provisional patent application Ser. No. 60/971,024, the entire contents of which are incorporated herein by reference.

BACKGROUND OF THE INVENTION

The invention relates generally to piping systems and in particular to a fitting for use with a tubing containment system. Currently, flexible piping, such as corrugated stainless steel tubing, is used in a number of applications requiring primary and secondary containment. Various plumbing as well as local and federal mechanical codes and specifications require that certain types of installations of flexible piping be protected by a secondary containment system. Tubing containment systems exist in the art to contain fluids if the tubing leaks. One existing tubing containment system is disclosed in U.S. Pat. No. 7,004,510, the entire contents of which are incorporated herein by reference.

SUMMARY

Embodiments of the invention include a fitting for use with metal tubing in a jacket, the fitting comprising: an adaptor having exterior threads at a first adaptor end, the adaptor having a longitudinal passage for fluid flow; a body having interior threads at a first body end, the interior threads engaging the exterior threads to secure the body to the body in a first body cavity; and a jacket lock ring positioned at a second body end, the jacket lock ring including barbs for engaging a surface of the jacket.

DETAILED DESCRIPTION OF THE PREFERRED EMBODIMENTS

Figure 1:
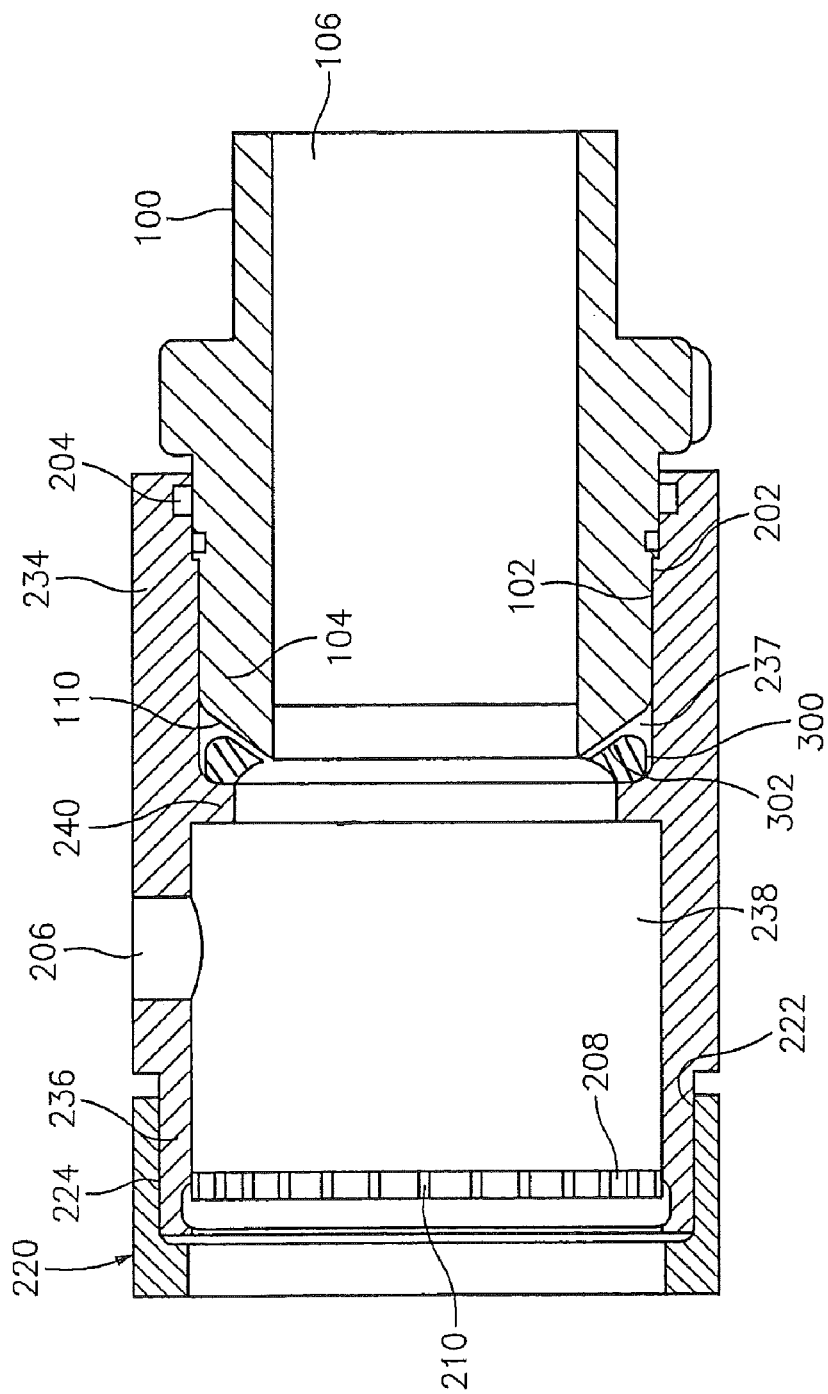
FIG. 1 is a cross-sectional view of an exemplary fitting for use in a tubing containment system.

FIG. 1 is a cross-sectional view of an exemplary fitting for use in a tubing containment system. The fitting includes an adaptor 100 and a body 200. The adaptor 100 includes threads 102 on the exterior of adaptor 100 at a first adaptor end 104 of adaptor 100. Body 200 includes threads 202 on an interior surface at a first body end 234 of the body 200. Adaptor 100 is threaded into a first cavity 237 at the first body end 234. Adaptor 100 includes a longitudinal through passage 106 to allow fluid (gas, liquid, etc.) to flow. Adaptor 100 may be similar to the Adaptor described in U.S. Pat. Nos. 5,799,989, 6,079,749 and 6,428,052 the entire contents of which are incorporated herein by reference. As described in U.S. Pat. Nos. 5,799,989, 6,079,749 and 6,428,052, adaptor 100 interacts with a sealing member 300 to compress corrugated tubing between the adaptor 100 and sealing member 300 to form a fluid tight seal. Sealing member 300 may be a formed by split ring washers, a collet or other member. Assembly of the fitting is described in further detail herein.

Figure 2:
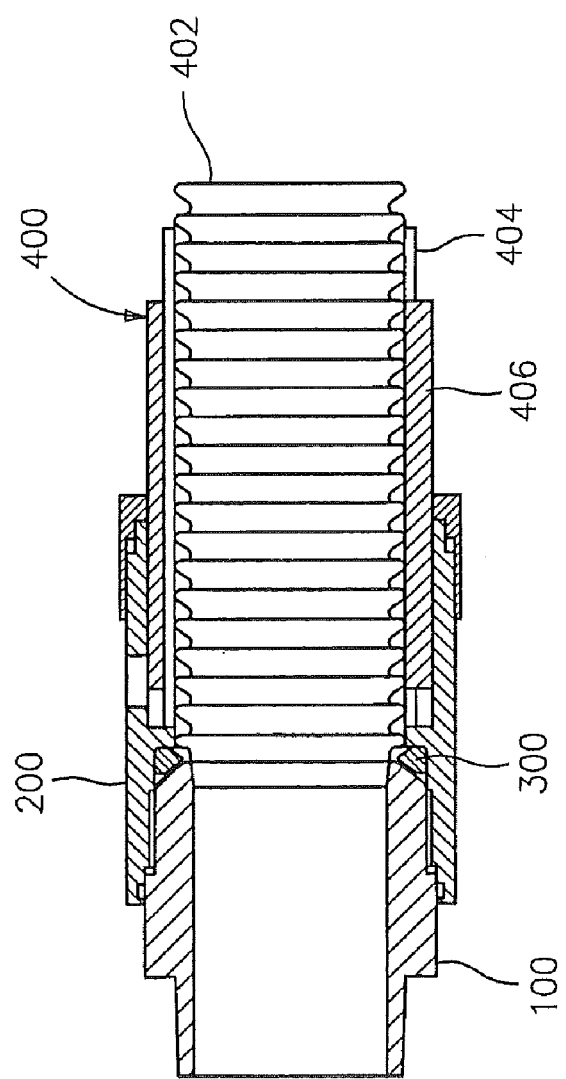
FIG. 2 is a cross sectional view of the fitting of FIG. 1 attached to tubing.

Body 200 includes an o-ring groove 204 formed on an interior surface of the body at first body end 234 proximate the adaptor 100. An o-ring may be positioned in the o-ring groove 204 to provide an enhanced seal between the body 200 and the adaptor 100. Body 200 also includes features that provide for venting of fluid in the event of a leak. Body 200 includes a vent opening 206 towards a second body end 236 of the body 200. The vent opening 206 extends through an exterior wall of body 200 into a second body cavity 238. Vent opening 206 provides for egress of fluid leaking from tubing 400 (FIG. 2). Sensors (not shown) may be placed in fluid communication with vent opening 206 for monitoring of leaking fluid.

A jacket lock ring 208 is positioned on a rear end of the body 200 and engages the jacket of tubing 400 (FIG. 2). The jacket lock ring 208 is received in a frusto-conical annular recess on the rear of the second body end 236 of body 200 where tubing 400 enters the fitting. Jacket lock ring 208 includes barbs 210 that engage the polymer jacket of the tubing 400. As described in further detail herein, this provides a mechanical attachment to the tubing to control axial extension of the fitting under pressure.

A seal nut 220 engages the rear of the second body end 236 of the body 200 to secure the jacket lock ring 208 in position. Seal nut 220 threadably engages the rear end of body 200 via threads 222 on an interior surface of the seal nut 220. Threads 224 are formed on an exterior surface on the distal portion of the second body end 236 of body 200. The seal nut 220 drives the jacket lock ring 208 axially into the frusto-conical recess to compress the jacket lock ring and drive barbs 210 the jacket lock ring 208 into the jacket of tubing 400.

FIG. 2 is a cross-sectional view of the fitting of FIG. 1 attached to tubing 400. The interior of tubing 400 is corrugated stainless steel tubing 402. A first jacket 404, manufactured from EFEP, for example, is positioned on the tubing 402. An exemplary fluoropolymer used for the first jacket 404 is available as RP-5000, from Daikin America. This material has the inherit properties of minimal permeation thus providing secondary containment, this allows fluids to flow to ends of the outer jacket 406 for venting as described in U.S. Pat. No. 7,004,510. A second outer jacket 406 surrounds the first jacket 404. An exemplary polymer used for the second jacket 406 is Nylon 12 available as Vestamid X7297, product of Degussa.

Figure 3:
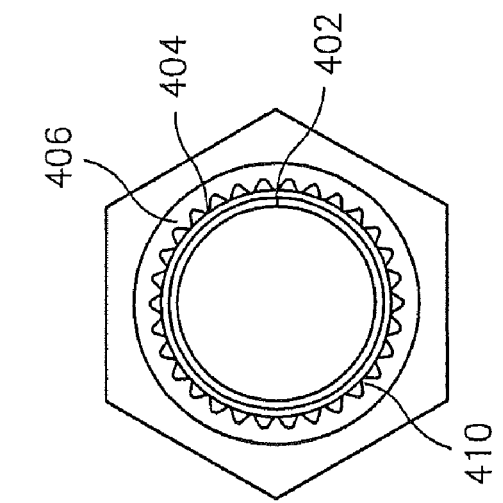
FIG. 3 is an end view of the tubing and a seal nut.

FIG. 3 is an end view of tubing 402, jacket 404 and outer jacket 406. FIG. 3 shows the inner diameter of outer jacket 406 having a number of ribs 410 separated by spaces. The ribs are longitudinal and run the length of outer jacket 406. Ribs 410 in FIG. 3 are triangular in cross-section, but it is understood that other geometries may be used. In the event that tubing 402 leaks, fluids travel along spaces between ribs 410 for venting through vent opening 206. As described in U.S. Pat. No. 7,004,510, a sensor may be coupled to the vent opening 206 to detect fluid leaks and signal such an event.

In assembling the fitting to the tubing 400, the tubing 400 is fed through the seal nut 220 and jacket lock ring 208. The distal end of tubing 400 has the jackets 404 and 406 removed to expose at least one valley of the corrugated tubing 402. Corrugated tubing 402 has an exterior surface of undulating peaks and valleys. The tubing 400 is fed through cavity 238 in body 200 to extend in and through body 200 and out the first body end 234. Sealing member 300 is placed in an exposed valley of corrugated tubing 402. The tubing 400 is pulled back through the body 200 until the sealing member 300 contacts a shoulder 240. Shoulder 240 extends radially inwardly into the interior of body 200 between first body cavity 237 and second body cavity 238. The sealing member 300 has an outer diameter greater than the inner diameter of the shoulder 240 so that shoulder 240 acts a stop limit travel of the tubing 400.

First end 104 of adaptor 100 is threaded into first body end 234 of body 200 via threads 102 and 202. As adaptor 100 travels into body 200, an adaptor sealing surface 110 contacts the exposed corrugated tubing 402 and compresses the metal tubing 402 between the adaptor sealing surface 110 and a sealing surface 302 on sealing member 300. As the adaptor 100 is tightened, the compression of the metal tubing 402 between the adaptor sealing surface 110 and the sealing surface 302 folds the metal tubing 402 to form two layers of metal between adaptor sealing surface 110 and sealing surface 302. This defines a metal-to-metal seal between the adaptor 100 and tubing 402.

Once the body 200 and adaptor 100 are sufficiently tightened, the seal nut 220 is threaded onto the distal portion of the second body end 236 of body 200. As seal nut 220 is tightened, jacket lock ring 208 is driven into the frusto-conical recess at the distal portion of the second body end 236 of body 200. This drives the lock ring 208 into the jacket 406 of tubing 400. Barbs 210 engage the jacket 406 to provide an additional mechanical connection point to the tubing 400.

The above-described fitting and tubing provides a double containment self-venting feature and a jacket lock. By virtue of the jacket lock ring 208 and seal nut 220, the fitting makes the outer jacket 406 a structural member of the joint, that is, axial extension under pressure is eliminated with this fitting.

The tubing containment system may be used in a number of applications including direct underground burial, above ground outdoor use, indoor use at elevated pressure for safety and other secondary containment and sensing systems for petrochemical lines.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A fitting for use with metal tubing in a jacket, the fitting comprising:
    an adaptor having exterior threads at a first adaptor end, the adaptor having a longitudinal passage for fluid flow;
    a body having interior threads at a first body end, the interior threads engaging the exterior threads to secure the adaptor to the body in a first body cavity; and
    a jacket lock ring being a separate element from the body, the jacket lock ring positioned at a second body end, the jacket lock ring including barbs, the barbs for engaging a surface of the jacket;
    a vent opening formed through an exterior wall of the body into a second body cavity, the second body cavity for receiving the tubing.

2. The fitting of claim 1 wherein:
    the body includes a frusto-conical recess at a distal portion of the second body end, the locking ring positioned in the frusto-conical recess.

3. The fitting of claim 1 further comprising:
    a sealing member positioned in the first body cavity;
    a shoulder extending radially inwardly into an interior of body;
    the sealing member positioned between the shoulder and a first adaptor end.

4. The fitting of claim 3 wherein:
    the adaptor first end includes a adaptor sealing surface;
    the sealing member includes a sealing surface;
    the adaptor sealing surface and sealing surface coacting to compress tubing therebetween.

5. The fitting of claim 3 wherein:
    the body includes an o-ring groove formed on an interior surface of the body at the first body end proximate the adaptor.

6. A fitting for use with metal tubing in a jacket, the fitting comprising:
    an adaptor having exterior threads at a first adaptor end, the adaptor having a longitudinal passage for fluid flow;
    a body having interior threads at a first body end, the interior threads engaging the exterior threads to secure the adaptor to the body in a first body cavity; and
    a jacket lock ring positioned at a second body end, the jacket lock ring including barbs, the barbs for engaging a surface of the jacket, wherein the body includes a frusto-conical recess at a distal portion of the second body end, the locking ring positioned in the frusto-conical recess;
    a vent opening formed through an exterior wall of the body into a second body cavity, the second body cavity for receiving the tubing; and
    a seal nut having seal nut threads on an interior surface thereof;
    the body having exterior body threads at the distal portion of the second body end proximate the frusto-conical recess, the seal nut threads engaging the exterior body threads.

7. A fitting coupled to metal tubing in a jacket, the fitting comprising:
    a adaptor having exterior threads at a first adaptor end, the adaptor having a longitudinal passage for fluid flow;
    a body having interior threads at a first body end, the interior threads engaging the exterior threads to secure the body to the adaptor in a first body cavity;
    a jacket lock ring positioned at a second body end, the locking ring including barbs for engaging a surface of the jacket, the body including a frusto-conical recess at a distal portion of a second body end the jacket lock ring positioned in the frusto-conical recess;
    a seal nut having seal nut threads on an interior surface thereof;
    the body having exterior body threads at the distal portion of the second body end proximate the frusto-conical recess, the seal nut threads engaging the exterior body threads;
    a vent opening formed through an exterior wall of the nut into a second body cavity, the second body cavity receiving the tubing;
    a sealing member positioned in the first body cavity;
    a shoulder extending radially inwardly into the interior of body, the sealing member positioned between the shoulder and the first adaptor end;
    the first adaptor end includes a adaptor sealing surface;
    the sealing member includes a sealing surface;
    the adaptor sealing surface and sealing surface coacting to compress tubing therebetween.

8. A fitting for use with metal tubing in a jacket, the fitting comprising:

an adaptor having exterior threads at a first adaptor end, the adaptor having a longitudinal passage for fluid flow;

a body having interior threads at a first body end, the interior threads engaging the exterior threads to secure the adaptor to the body in a first body cavity; and a jacket lock ring positioned at a second body end, the jacket lock ring including barbs, the barbs for engaging a surface of the jacket, wherein the body includes a frusto-conical recess at a distal portion of the second body end, the locking ring positioned in the frusto-conical recess;

a seal nut having seal nut threads on an interior surface thereof; and the body having exterior body threads at the distal portion of the second body end proximate the frusto-conical recess, the seal nut threads engaging the exterior body threads.

* * * * *